United States Patent [19]

Wilson et al.

[11] 3,945,450

[45] Mar. 23, 1976

[54] APPARATUS AND METHOD FOR RENDERING AN OFFSHORE DRILLING PLATFORM SELF MOBILE

[75] Inventors: Clyde H. Wilson; Donald M. Cross; James A. Dupuy, all of Vicksburg, Miss.; Duel J. Tarrant, Houston, Tex.

[73] Assignee: Marathon-LeTourneau Company, Vicksburg, Miss.

[22] Filed: Feb. 10, 1975

[21] Appl. No.: 548,238

[52] U.S. Cl. ................................ 180/8 R; 61/46.5
[51] Int. Cl.² ....................................... B62D 57/02
[58] Field of Search.......... 180/8 R, 8 B, 8 BA, 8 C, 180/8 D, 8 E, 7 R, 4; 61/46.5; 173/22, 23; 305/1

[56] References Cited
UNITED STATES PATENTS
2,378,945   12/1945   Otzmann........................ 180/8 A X
3,853,196   5/1974   Guest.................................. 180/8 C FOREIGN PATENTS OR APPLICATIONS
1,245,464   9/1960   France................................ 180/8 R
952,584   3/1964   Germany............................. 180/8 E Primary Examiner—M. H. Wood, Jr.
Assistant Examiner—John A. Pekar
Attorney, Agent, or Firm—Vinson, Elkins, Searls, Connally & Smith

[57] ABSTRACT

Apparatus which renders a self-elevating drilling platform self-mobile on land and a method of moving the drilling platform employing the apparatus. The self-elevating platform includes a body, forward and rear legs, and means for adjusting the legs by moving the legs with respect to the body and moving the body with respect to the legs. The apparatus includes a launch pad which will be pivotally mounted to the platform beneath the body. In operation, the legs of platform are adjusted so that, alternatively, the launch pad swings forward beneath the body when the pad is elevated off the ground and the body pivots forward around the pad when the pad is on the ground.

9 Claims, 8 Drawing Figures

U.S. Patent   March 23, 1976   Sheet 1 of 2   3,945,450
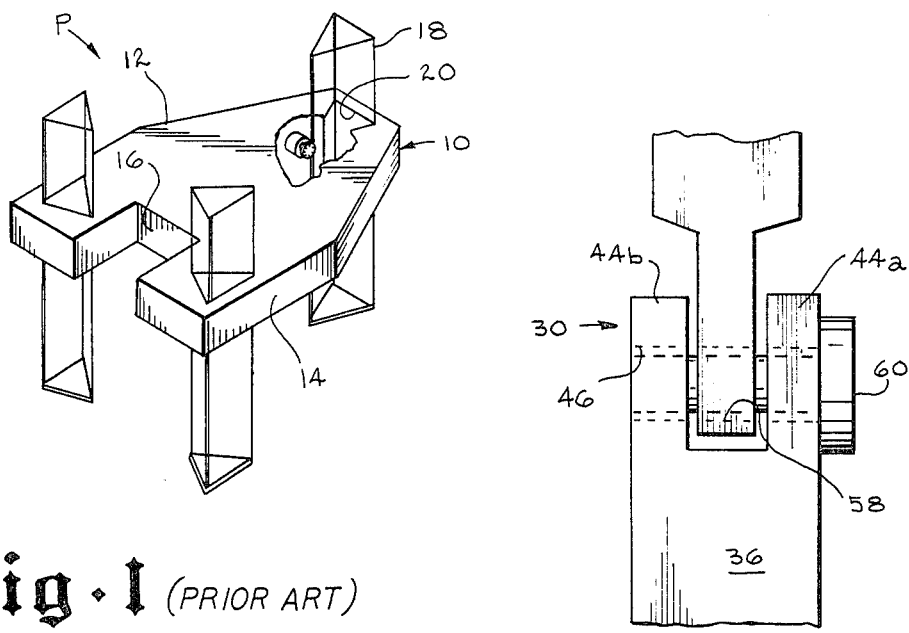
fig. 1 (PRIOR ART)
fig. 4
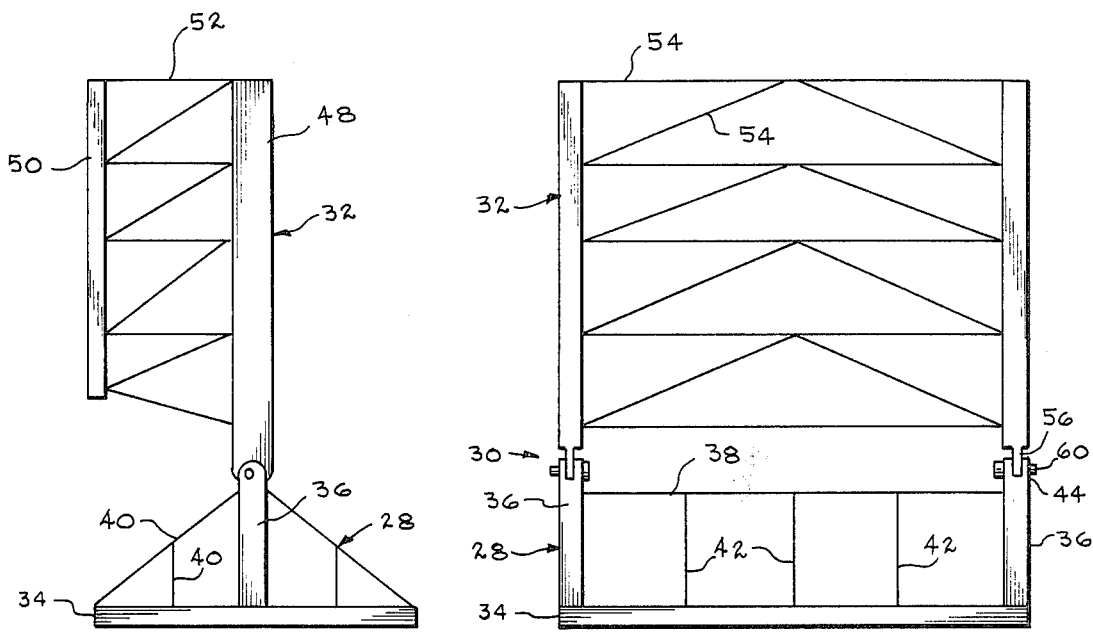
fig. 2
fig. 3

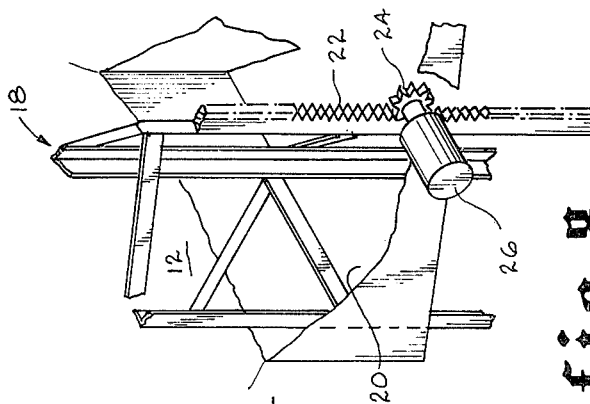
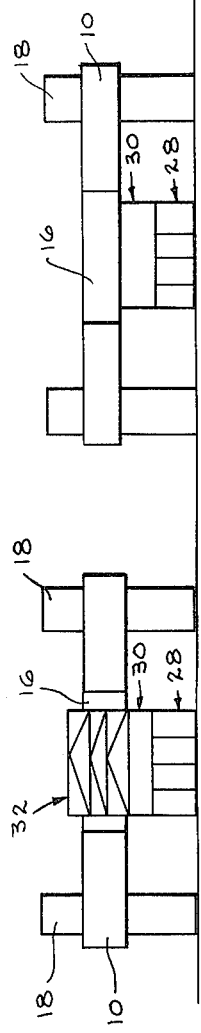
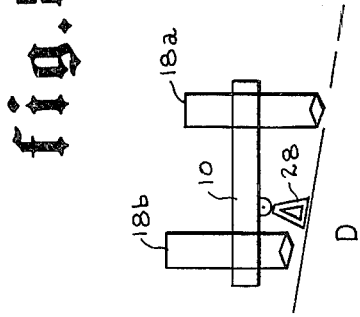
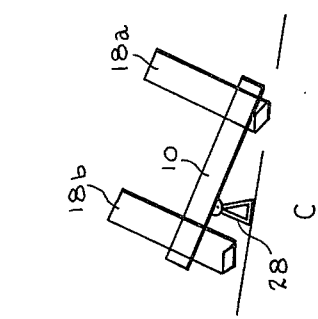
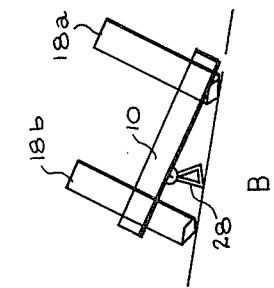
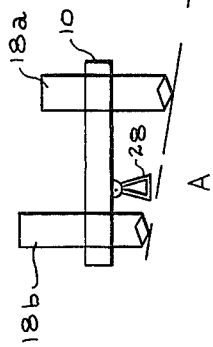

3,945,450

APPARATUS AND METHOD FOR RENDERING AN OFFSHORE DRILLING PLATFORM SELF MOBILE

BACKGROUND OF THE INVENTION

1. Field of the Invention

This invention relates to a method and apparatus for moving on land a large self-elevating structure such as a mobile sea oil drilling platform. Many mobile sea oil drilling platforms are constructed at locations which have facilities, such as ramps or inclined ways, for sliding the completed platform into the water for launching. However, in areas subject to wide changes in shore line and water depth, such as large rivers and shallow tidal areas, inclined launched ways are impractical. This invention finds particular utility at mobile sea oil drilling platform construction locations where launch ways cannot be used and provides an apparatus whereby the platform is rendered self-mobile as well as a method of moving the platform employing the apparatus.

2. The Prior Art

Inclined launch ways cannot be used to launch a completed mobile offshore oil drilling platform where the shoreline location is subject to wide variance due to tides or river levels. One previous launching system employed at such a location, on the Mississippi river, employed bull-dozers to build a large pile of dirt under the rear portion of the body of the elevated platform. The legs of the platform were then adjusted to pivot the platform forward on the dirt pile; after which the body of the platform would be raised, the bull-dozers would move the pile of dirt forward so the platform could be pivoted forward again. Prior to each pivoting operation the dirt pile would have to be packed several times by resting the weight of the platform on the pile before it would be in a condition to permit the platform to be pivoted upon it.

The use of such procedure to launch the completed platform was extremely tedious and expensive requiring the continuous use of several pieces of special earth moving equipment and attendants for as much as 2 weeks.

OBJECTS OF THE INVENTION

It is an object of this invention to provide a system to render a mobile sea oil drilling platform self mobile on land.

A further object of this invention is to provide a system, as in the preceding object, utilizing special launching apparatus which can be attached to and removed from the drilling platform.

Additionally it is an object of this invention to provide a method of moving a mobile sea oil drilling platform on land employing the system of this invention.

These and other objects and features of advantage of this invention will become apparent from the drawings, detailed description and claims.

BRIEF DESCRIPTION OF THE DRAWINGS

In the drawings wherein like numerals indicate like parts and wherein illustrative embodiments of this invention are shown:

FIG. 1 is a schematic drawing of a prior art self elevating drilling platform which can be rendered self mobile on land utilizing the system and method of this invention;

FIG. 2 is a side elevational view of the launch pad apparatus and its support frame which may be attached to the body of the FIG. 1 platform;

FIG. 3 is a front elevational view of the launch pad and its support frame;

FIG. 4 is an enlarged front view of the means for mounting the launch pad;

FIG. 5 is a schematic view in front elevation of the support frame attached to the body of the drilling platform with the launch pad mounted to the frame;

FIG. 6 is another schematic view in front elevation showing an alternative mounting of the launch pad to the body of the drilling platform;

FIGS. 7A through 7D are a series of schematic drawings depicting the method of moving the platform according to the invention; and FIG. 8 is an illustration of a rack and pinion gear system which may be employed to adjust the legs of the platform.

DESCRIPTION OF THE PREFERRED EMBODIMENT

Referring to FIG. 1, the platform P, to be moved will include a body 10 with a deck 12 and a hull 14. Through the deck 12 and the hull 14 extends a drilling slot 16. Above the drilling slot 16 on the deck 12 of the body 10 a drilling rig will be positioned, and drillng and well completion apparatus will extend downward from the rig, through the slot 16 and to the well site on the ocean floor. A power plant, equipment storage area, and other conventional drilling apparatus, equipment, quarters, etc., may be located on the deck 12 as desired.

A self-elevating, mobile off-shore drilling platform P includes a plurality, generally three, of elevating legs 18. The legs 18 are attached to the body 10 in a manner that enables the legs 18 to be moved perpendicular to the body 10 so that by adjusting the legs 18 the height of the body 10 may be changed. The illustrated leg attaching means is provided by positioning each leg 18 in a spud well 20 of the platform hull 14. Within each spud well 20 and associated with each leg 18 are means for adjusting the legs by moving them in a direction perpendicular to the body 10. The adjusting means can both move the body 10 with respect to the leg 18 if the leg is stationary and move the leg 18 with respect to the body 10 if the body 10 is held stationary or by moving the legs 18 individually, either upward or downward relative to the body 10. The leg adjusting means may be any conventional system utilized in self-elevating off-shore drilling platforms. As an example, the adjusting means may include a gear rack 22 disposed longitudinally along each corner of each leg 18. A gear pinion 24, powered by an electric motor 26 is located in each corner of the spud wells 20 and engages the gear rack 22. The rack 22 and pinion 24 system can operate to adjust each leg 18 of the platform P in the manner described in U.S. Pat. No. 3,183,676 to LeTourneau, the disclosure of said patent being herein incorporated by reference for all purposes.

For rendering the offshore drilling platform P self mobile on land there is associated with the platform P a launch pad, generally indicated at 28, and means for pivotally mounting the launching pad to the platform, generally indicated at 30. The body 10 can be formed with the mounting means 30 integral with the body 10. The mounting means 30 would then extend downward from the underside of the hull 14 as shown in FIG. 6.

However, if the mounting means 30 is not formed integral with the body 10, a support frame, generally indicated at 32, is provided. The illustrated support frame 32 is adapted to be attached to the body 10 in the drilling slot 16 and the launch pad 28 is mounted to the support frame 32 as shown in FIG. 5.

Referring now to FIGS. 2 through 5, the embodiment of the invention which includes a support frame 32 will be described. During certain steps of the process utilizing the apparatus of this invention the launch pad 28 will be supported by the mounting means 30 in a suspended position beneath the body 10. During other steps of the process, the mounting means 30 is a fulcrum about which the platform P pivots. A portion of the weight of the platform P is transmitted through the support frame 32, through the mounting means 30, through the launch pad 28 and to the ground. The launch pad 28 is constructed so that it is capable of bearing the weight of the platform P and is of such a size so that it can support the weight of the platform P without sinking into the soil. The launch pad 28 is also adapted to be suspended from the mounting means 30, and while suspended, to swing freely beneath the body 10. The mounting means 30 is capable of supporting the launch pad 28 in a suspended position beneath the body 10 and of transmitting the weight of the platform P to the launch pad 28. The support frame 32 is constructed and attached to the body 10 so that the transmission of forces occurs without adversely affecting the body 10.

As illustrated in FIGS. 2 and 3, the launch pad 28 has a generally rectangular base 34. The base 34 is of an area sufficient to support the portion of the weight of the platform P borne by the launch pad 28 without significant sinking into the soil. Near either extremity of the base 34, along its longitudinal center line, are upright struts 36. The struts transmit forces from the mounting means 30 to the base 34. A cross beam 38 connects the struts 36 near their upper extremities. Appropriate braces 40 connect the struts with the base 34 and stiffners 42 connect the cross beam 38 with the base 34.

Forming a portion of the mounting means 30 is a clevice 44 at the upper extremity of each strut 36. Each prong 44a and 44b of the clevis 44 has a circular hole 46 therethrough.

The support frame 32 is adapted to be connected to the launch pad 28, to be attached to the body 10 of the platform P and to transmit forces from the platform P to the launch pad 28 without adversely affecting the body 10. The preferred location for attaching the support frame 32 to the body 10 is in the drilling slot 16 of the body 10. The illustrated support frame 32 has two main load bearing members 48 and two bending movement resisting elements 50. As seen in FIG. 2, connecting one load bearing member 48 with one bending movement resisting element 50 is a lattice work of trusses 52. FIG. 3 illustrates the truss members 54 which connect the two load bearing members 48.

Forming another portion of the mounting means 30 is an ear 56 at the lower extremity of each of the load bearing members 48. The load bearing members 48 are spaced so that each ear 56 can be inserted between the clevice prongs 44a and 44b of the launch pad struts 36. Each ear 56 has a circular hole 58 therethrough of approximately the same diameter as the hole 48 through the clevice prongs 44a and 44b.

When the support frame 32 is utilized, the mounting means 30 includes the clevices 44 of the launch pad 28 and the ears 56 of the support frame 32. The launch pad 28 is mounted to the support frame 32 by arranging the launch pad 28 with respect to the support frame 32 so that the ears 56 may be inserted between the clevice prongs 44a and 44b. With the ears 56 inserted between the prongs 44a and 44b, the clevise prongs' holes 46 are aligned with the ears' holes 58 and a circular pin 60 is inserted into the aligned holes 46 and 58. The outer surface of the pin 60 and the inner surfaces of the holes 46 and 58 engage and are load bearing. These surfaces may be lubricated as desired.

In an alternative embodiment of this invention, ears are formed integrally with the body 10 and project downward from the underside of the hull 14. For this embodiment, the mounting means 30 includes the ears of the body 10, the clevices 44 of the launch pad 28 and a pin. The body 10 would be reinforced so that the transmission of forces from the body 10, through the mounting means 30 and to the launch pad 28 occurs with out adversely affecting the body 10. The ears would be arranged on the underside of the hull 14 so that they could be disposed between the clevis prongs 44a and 44b of the launch pad struts 36. Each ear has a circular hole therethrough. To mount the launch pad 28, to the body 10 the launch pad 28 is positioned beneath the body 10 so that the ears may be inserted between the clevis prongs 44a and 44b. When the ears are between the prongs 44a and 44b, the holes are aligned and the pins 60 inserted therein. Again, the outer surface of the pin and the inner surfaces of the holes engage, are load bearing, and may be lubricated as desired.

The body 10 of the self elevating mobile offshore drilling platform P is constructed at a convenient land facility. Likewise the legs 18 and the leg adjusting means are built at a convenient location. The location. The adjusting means is positioned in the body 10 and the legs 18 are positioned in the spud wells 20 where they can be engaged by the leg adjusting means. The legs 18 are adjusted to raise the body 10 off the ground.

With the constructed body 10 elevated above the ground and supported by the legs 18, the apparatus for rendering the self-elevating platform P self mobile can be attached to the body 10. If the embodiment of this sytem which includes a support frame 32 is utilized, the support frame 32 is attached to the body 10 and the launch pad 28 is mounted to the support frame 32. It is preferred that the support frame 32 be attached to the body 10 in the drilling slot 16 of the body 10. The support frame 32 can be attached to the body 10 in any conventional manner, such as by welding. To permit the mounted launch pad 28 to swing freely beneath the body 10, the support frame 32 is attached to the body 10 so that the ears 56 extend below the underside of the hull 14. The launch pad 28 is positioned under the body 10 with the clevice prongs 44a and 44b disposed on either side of each ear 56. To mount the launch pad 28 to the support frame 32, the holes 46 through the clevise prongs 44a and 44 b are aligned with the hole 58 through the ear 56 and a pin 60 is inserted into the aligned hole.

If the alternative embodiment of the system for rendering the self elevating platform P self mobile is utilized, when the body 10 has been raised off the ground by the legs 18, the ears will be extending downwardly from the hull 14. The launch pad would be positioned beneath the body 10 with its two sets of clevices 44 disposed so that a prong 44a and 44b is on each side of each ear. To mount the launch pad 28 to the body 10, the holes 46 through the clevice prongs 44a and 44b are aligned with the hole through each ear. Pins 60 are then inserted into the aligned holes.

The illustrated mounting of the launch pad 28 renders the platform P self mobile in accordance with a process to be hereinafter described. The pivotal mounting of the launch pad 28 under the body 10 enables the launch pad to swing freely beneath the body 10 when the body 10 is elevated so that the launch pad 28 is off the ground. The launch pad 28 swings in the direction of movement of the platform P. Thus a line through the mounting means 30 would be perpendicular to the direction of movement of the platform P. In conjunction with at least one leg 18 the mounted launch pad 28 is capable of bearing the weight of, and maintaining upright, the platform P. Since the body 10 is pivoted about the mounting means 30 when the launch pad 28 is bearing a portion of the weight of the platform P, the mounting means 30 is positioned so that the center of gravity of the platform P is between the mounted launch pad 28 and at least one leg 18. In accordance with the method of moving the platform P utilizing the system of the invention, the leg 18 that bears the other portion of the platform's weight is a forward leg 18a. The launch pad 28, thus bears, at least, approximately that portion of the platform's weight that is normally borne by the rear legs 18b.

The self elevating platform P is moved by a cyclic process. The platform P moves forward twice during each cycle. During the moving process, with the launch pad 28 mounted so that the center of gravity of the platform P is between the launch pad 28 the forward leg 18a. The launch pad 28 may be mounted between the forward leg 18a and at least one rear leg 18b, as illustrated in FIG. 7, or the rear leg 18b may be between the launch pad 28 and the forward leg 18a.

If the platform P has three legs 18, as illustrated in FIG. 1, it is suggested that the launch pad 28 be mounted to the body 10 so that during the moving process there will be one forward leg 18a and two rear legs 18b. During the moving process the bottom of the forward leg 18a is not raised off the ground. The soil under the forward leg 18a shears when the leg 18a moves by sliding over the soil. Shearing the soil under only one leg utilizes less horizontal force than shearing soil under two legs. Thus one leg 18a is utilized as the forward leg 18a.

The first step of the cyclic process whereby the platform P is moved is to raise the body 10 above the ground so as to suspend the launch pad 28 beneath the body 10. The body 10 is raised, with the bottoms of the forward leg 18a and rear legs 18b on the ground, by utilizing the leg adjusting means to raise the body 10 on the legs 18. Preferably the launch pad 28 is suspended with its base 34 a uniform distance above the ground to facilitate uniform transmission of forces from the launch pad 28 to the body 10 when the legs are adjusted and the weight of the platform P is transferred from the legs 18 to the launch pad 28. If the ground is level or sloped downward in the desired direction of motion of the platform P, the launch pad 28 would be suspended in a level position beneath the body 10 by adjusting the legs so that the body is level between the rear 18b. The completed first step of the cyclic moving process is illustrated in FIG. 7A with the body 10 also being horizontal between the forward leg 18a and the rear legs 18b.

In the second step of the cyclic moving process, the platform P is given a first forward motion by inclining the body 10 downward in the desired direction of travel. The downward inclination of the body 10 is provided by adjusting the forward leg 18a to lower the body 10 on legs 18a. As the body 10 is being lowered on leg 18a, the legs 18b tilt forward and the launch pad 28 swings forward, like a pendulum, beneath the body 10. The inclining forward of the body 10 and the tilting forward of the legs results in the geometric center of the body 10 being moved forward above the ground as depicted in FIG. 7B.

A portion of the weight of the platform P normally borne by the rear legs 18b is shifted from the rear legs 18b to the launch pad 28 in the third step of the cyclic moving process. To shift the weight from the rear legs 18b to the launch pad 28, the rear legs 18b are adjusted by raising them with respect to the body 10. To permit performance of the fourth step of the process, the rear legs 18b are adjusted until their bottoms have cleared the ground. The completed third step is illustrated in FIG. 7C.

During the fourth step of the cyclic moving process, the platform P receives a second forward motion when the forward downward inclination of the body 10 is lessened. The forward downward inclination is lessened by adjusting the forward leg 18a to raise the body 10 on leg 18a. While the body 10 is being raised on leg 18a, the body 10 is pivoted about the mounting means 30 and the bottom of the forward leg 18a is shearing the soil beneath it and moving forward. Since they are off the ground, the bottoms of the rear legs 18b swing forward with the pivoting of the body 10. The platform P and launch pad 28 are dipicted with the fourth step of the moving process completed in FIG. 7D. This step results in the geometric center of the body 10 receiving a second forward increment of movement.

The final step of the moving process involves shifting the weight of the platform P from the forward leg 18a and the launch pad 28 to the forward leg 18a and the rear legs 18b so that the cyclic process may be repeated. The weight of the platform P is shifted by adjusting the legs 18 to raise the body 10 with respect to the legs 18. The leg adjustment is continued until the first step of the cyclic process is completed and the platform P is returned to the position indicated in FIG. 7A. During this adjustment, since the launch pad 28 will be suspended above the ground, the launch pad 28 swings forward beneath the body 10.

The cycle is then repeated until the platform has been moved forward its desired distance.

Although FIGS. 7A and 7D show the body 10 as being horizontal after the completion of the first and fourth steps, respectively, of the cyclic moving process, it is not necessary for the legs 18 to be adjusted so that the body 10 is horizontal. Adjusting the legs 18 takes time, and depending upon the speed with which the legs 18 can be moved, the incremental forward motion received by the platform P in the forth step by adjusting the forward leg 18a until the body is horizontal may not justify the additional time involved. In such event it is suggested that, during the fourth step of the cyclic moving process, the forward leg 18a be adjusted sufficiently to pivot the body 10 about the mounting means 30, to swing the bottom of the rear legs 18b forward and to slide the bottom of the forward leg 18a forward as it shears the soil. When an optimal amount of such forward motion has been obtained, the adjustment of the forward leg 18a may cease. To then raise the body 10 to suspend the launch pad 28 beneath the body 10 and return the platform P to its position with the first step completed, the forward leg 18a and the rear legs 18b are adjusted simultaneously to raise the body 10 with respect to the legs 18. With simultaneous adjustment of the legs 18, the body 10 throughout the final and first step of the moving process may remain parallel to the inclination it had after the completion of the fourth step of the moving process.

The maximum inclination of the body 10 with respect to a horizontal plane will occur during steps two and three of the cyclic moving process. The maximum amount of inclination is limited by the stress capabilities of the body 10, the legs 18, the leg attaching means, the leg adjusting means, and the support frame 32. Preferably the inclination should not exceed 15° from a horizontal plane. For example, if the ground has a 5° inclination and it is desired to move the platform P downhill, the maximum inclination of the body 10 with respect to the ground would be 10°.

With the system and method described above, a mobile self elevating offshore drilling platform P may be moved on level ground. However, the system works better when the ground is inclined downward in the direction it is desired to move the platform P. The better operation with the downward inclination of ground occurs because component of the platform weight force vector parallel to the inclination tends to aid the sliding over the ground and the shearing of the soil of the forward leg 18a during the fourth step of the moving process.

Utilizing the system and method of this invention, the offshore drilling platform P is moved from its construction location and into the water for a sufficient distance that the body 10 is capable of floating on the water. Once the body 10 is floating, the launch pad 28 and support frame 32 may be removed from the body 10. To do so, the support frame 32 attachments to the body 10 are disconnected and the launch pad 28 is dismounted by pulling the pin 60 from the mounting means 30.

The foregoing disclosure and description of the invention is illustrative and explanatory thereof and various changes in the process, as well as changes in the size, shape and materials or changes as to the details of the illustrated construction may be made within the scope of the appended claims without departing from the spirt of the invention.

What is claimed is:

1. An apparatus for rendering a self elevating, mobile offshore drilling platform self mobile on land, the platform including a body, at least one forward leg attached to the body, at least one rear leg attached to the body, and means for adjusting the legs which is capable of moving the legs with respect to the body and moving the body with respect to the legs; the apparatus comprising:

a launch pad capable of bearing a portion of the weight of the platform and mean for pivotally mounting said launch pad to the body of the platform, said mounting means being positioned to enable the mounted launch paid to swing freely beneath the body and to locate the center of gravity of the platform between the forward leg and the mounted launch pad.

2. A method of moving a self elevating offshore drilling platform on land, the platform including a body, at least one forward leg attached to the body, at least one rear leg attached to the body, and means for adjusting the legs which is capable of moving the legs with respect to the body and moving the body with respect to the legs; the method utilizing a launch pad capable of bearing a portion of the weight of the platform and means for pivotally mounting said launch pad to the body of the platform positioned to enable the mounted launch pad to swing freely beneath the body and to locate the center of gravity of the platform between the forward leg and the mounted launch paid, the method including the steps of:

a. adjusting the legs to elevate the body to permit the launch pad to swing freely beneath the body;

b. adjusting the forward leg to incline the body downward at the forward leg whereby the launch pad swings forward beneath the body and the platform receives one forward motion;

c. adjusting the rear leg to shift the portion of the weight of the platform from the rear leg to the launch pad;

d. adjusting the forward leg to lessen the forward inclination of the body and to pivot the platform around the mounting means whereby the bottom of the forward leg slides forward as the soil beneath it is sheared, the bottom of the rear leg swings forward, and the platform receives another forward motion;

e. adjusting the legs to elevate the body to permit the launch pad to swing forward beneath the body; and f. repeating step (a) through (e) until the platform is moved to its desired location.

3. The method of claim 2 wherein when the step of adjusting the legs to elevate the body to permit the launch pad to swing freely beneath the body is completed, the body is in a substantially horizontal plane.

4. The method of claim 2 wherein when the step of adjusting the legs to elevate the body to permit the launch pad to swing freely beneath the body is completed, the body is inclined downward towards the forward leg.

5. The method of claim 2 wherein when the step of adjusting the forward leg to lessen the forward inclination of the body and to pivot the platform around the mounting means is completed the body is in a substantially horizontal plane.

6. The method of claim 2 wherein when the step of adjusting the forward leg to lessen the forward inclination of the body and to pivot the platform around the mounting means is completed the body is inclined downward towards the forward leg.

7. A method of moving a self elevating offshore drilling platform on land, the platform including a body, at least one forward leg attached to the body, at least one rear leg attached to the body and means for adjusting the legs which means are capable of moving the legs with respect to the body and moving the body with respect to the legs; the method utilizing a launch pad capable of bearing a portion of the weight of the platform and adapted to be suspended beneath the body of the platform and means for pivotally mounting said launch pad to the body of the platform positioned to enable the mounted launch pad to swing freely beneath the body and to locate the center of gravity of the platform between the forward leg and the mounted launch pad; the method including the steps of:

a. constructing the platform;
b. adjusting the legs to elevate the body;
c. mounting the launch pad to the body;
d. adjusting the legs to elevate the body to permit the launch pad to swing freely beneath the body;
e. adjusting the forward leg to incline the body downward at the forward leg whereby the launch pad swings forward beneath the body and the platform receives one forward motion;
f. adjusting the rear leg to shift a portion of the weight of the platform from the rear leg to the launch pad;
g. adjusting the forward leg to lessen the forward inclination of the body and to pivot the platform around the mounting means whereby the bottom of the forward leg slides forward as the soil beneath it is sheared, the bottom of the rear leg swings forward, and the platform receives another forward motion;
h. adjusting the legs to elevate the body to permit the launch pad to swing forward beneath the body;
i. repeating steps (d) through (h) until the platform is moved to its desired location; and
j. dismounting the launch pad from the body.

8. A system for rendering a self elevating, mobile offshore drilling platform self mobile on land, the platform including a body, one forward leg attached to the body, two rear legs attached to the body, and means for adjusting the legs which is capable of moving legs with respect to the body and moving the body with respect to the legs; the system comprising:
  a launch pad capable of bearing a portion of the weight of the platform and adapted to be suspended beneath the body and
  means for pivotally mounting said launch pad to the body, said mounting means being positioned to enable the mounted launch pad to swing freely beneath the body and to locate the center of gravity of the platform between the forward leg and the mounted launch pad.

9. The system of claim 8 wherein the means for adjusting the legs includes
  at least one gear rack along the length of each leg,
  a gear pinion to engage each gear rack mounted in the body, and
  electrical motor means for driving the gear pinions.

* * * * *